United States Patent [19]

Terao et al.

[11] 4,357,616
[45] Nov. 2, 1982

[54] RECORDING MEDIUM

[75] Inventors: Motoyasu Terao, Tokyo; Yoshio Taniguchi, Hino; Shinkichi Horigome, Tachikawa; Kazuo Shigematsu, Kawasaki; Masahiro Ojima, Kokubunji; Yoshinori Miyamura, Tokyo; Seiji Yonezawa, Hachioji, all of Japan

[73] Assignee: Hitachi, Ltd., Tokyo, Japan

[21] Appl. No.: 131,761

[22] Filed: Mar. 19, 1980

[30] Foreign Application Priority Data

Mar. 26, 1979 [JP] Japan .................................. 54-34424
Sep. 5, 1979 [JP] Japan ........................... 54-121818[U]
Jan. 11, 1980 [JP] Japan ............................... 55-1218[U]

[51] Int. Cl.$^3$ ........................................... G01D 15/34
[52] U.S. Cl. ................................. 346/135.1; 346/76 L; 430/945
[58] Field of Search ........................ 346/135.1, 76 L; 430/945

[56] References Cited

U.S. PATENT DOCUMENTS

| | | | |
|---|---|---|---|
| 3,869,301 | 3/1975 | Decker | 346/135.1 X |
| 3,996,057 | 12/1976 | Kawaziri | 430/526 X |
| 4,188,214 | 2/1980 | Kido | 430/945 X |
| 4,214,249 | 7/1980 | Kasai | 346/135.1 |
| 4,237,468 | 12/1980 | Nahara | 346/135.1 |
| 4,238,803 | 12/1980 | Terao | 346/135.1 |

OTHER PUBLICATIONS

Terao, Motoyasu, Reversible Optical Memory . . . of Paraffin Films, Japan Society of Applied Physics, vol. 44, 1975, pp. 79–84.

Kobayashi et al., Infrared Holography with Wax and Gelatin Film, Applied Physics Letters, vol. 19, No. 11, Dec. 1, 1971, pp. 482–484.

Primary Examiner—Joseph W. Hartary
Attorney, Agent, or Firm—Antonelli, Terry & Wands

[57] ABSTRACT

A recording medium having at least a first inorganic material layer which overlies a predetermined substrate and which exhibits a light absorptivity for projected light, and a recording layer which overlies the first inorganic material layer and whose principal component is an organic material. The first inorganic material layer contains at least one element selected from the group consisting of In, Bi, Te, Sb, Ge, Sn, Pb, Cr, Nb, Ni, Pd, Fe, Pt, Re, Ta, Th, Ti, Zr and Tl and the content of the element or elements is at least 65 atomic-%.

Further, the first inorganic material layer may well be overlaid with a second inorganic material layer which exhibits a light transmissivity higher than that of this first inorganic material layer. Preferable as the material of the second inorganic material layer is an inorganic material which contains at least one element selected from the group consisting of In, Bi, Te, Sb, Pb, Ge and Sn and at least one element selected from the group consisting of S, Se and O.

In proximity to at least one surface of the first inorganic material layer, at least one stabilizing layer may be disposed as well.

13 Claims, 13 Drawing Figures

RECORDING MEDIUM

BACKGROUND OF THE INVENTION

1. Field of the Invention

This invention relates to a recording medium which exploits the removal by vaporization, the deformation, etc. of a recording thin film as effected by the use of heat from a recording beam such as laser beam and/or heat generated indirectly through auxiliary means.

2. Description of the Prior Art

Heretofore, as the recording thin film of the type described above, an embodiments employing paraffin, oil or the like has been known. This technique performs the display, storage, transfer etc. of an image by projecting infrared light onto the recording thin film of paraffin or the like and by utilizing the deformation of the thin film based on the effect of vaporization and/or the effect of diffusion to the circumference. To the end of improving the disadvantages of this aspect, for example, the disadvantage that the image of paraffin or the like is prone to naturally disappear on account of the remaining heat after the projection of light, a proposal as described below has also been made. A substance which absorbs the light to-be-projected well is arranged on a predetermined substrate, and heat which is generated by the light having been absorbed by the substance is given to the recording film so as to cause the deformation of the recording film based on vaporization and movement. Even when the layer of the substance to absorb the projected light is made as a thin layer, the light absorption is sufficiently great. Accordingly, the supply of the heat to the recording film proceeds efficiently, and the natural disappearance of the image after the projection as above described hardly occurs. That is, the image can be satisfactorily stored. As the substances which absorb the projected light, there are employed CdS, CdSe, $As_2S_3$ etc. The recording media of this type are disclosed in the official gazette of Japanese Patent Application No. 48-142442.

It is the present situation, however, that such recording media have not yet been put into practical use because the recording sensitivity and the readout error rate (signal-to-noise ratio) thereof are not satisfactory in practical use.

Presently there is a demand to adopt a semiconductor laser device as a recording beam source for the recording media of the specified type.

Prior art is described in the following literature:

(1) S. Kobayashi and K. Kurihara; Appl. Phys. Letters 19 (1971), p. 482

(2) M. Terao; Proceedings of the 6th Conference on Solid State Devices, Tokyo, 1974, Supplement to the Journal of the Japan Society of Applied Physics, vol. 44, 1975, pp. 79–84.

SUMMARY OF THE INVENTION

In accordance with this invention, there is provided a recording medium including at least a first inorganic material layer which overlies a predetermined substrate and which exhibits a light absorptivity for projected light, and a recording layer which overlies the first inorganic material layer and whose principal component is an organic material, characterized in that the first inorganic material layer contains at least one element selected from the group consisting of In, Bi, Te, Sb, Ge, Sn, Pb, Cr, Nb, Ni, Pd, Fe, Pt, Re, Ta, Th, Ti, Zr and Tl and that the content of the element or elements is at least 65 atomic-%.

Further, the first inorganic material layer may well be overlaid with a second inorganic material layer which exhibits a read-out light transmissivity higher than that of the first inorganic material layer. Preferable as the material of the second inorganic material layer is an organic material which contains at least one element selected from the group consisting of In, Bi, Te, Sb, Pb, Ge and Sn and at least one element selected from the group consisting of S, Se and O.

In proximity to at least one surface of the first inorganic material layer, at least one stabilizer layer may be disposed as well.

The recording medium of this invention demonstrates especially excellent properties in case where the minor diameters of individual holes or recesses which are formed by the recording are 0.5 μm–1.5 μm, and in case where the recording beam-projecting time of one spot is 10 ns–500 ns.

The recording medium of this invention can satisfactorily record information even in case of employing a semiconductor laser device as a recording beam source. Thus, this invention provides the recording medium which is higher in the recording sensitivity, lower in the readout error rate and higher in the signal-to-noise ratio than the recording media of the same type in the prior art.

DETAILED DESCRIPTION OF PREFERRED EMBODIMENTS

In a recording medium of this invention, a material which absorbs projected light is selected as described below, and a recording film which is principally made of an organic material is disposed in sufficient proximity ("close contact" being included) to the light absorbing material.

Figure 1:
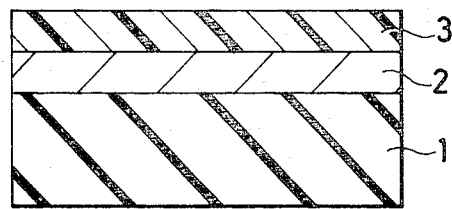
FIGS. 1 and 2 are sectional views of recording media according to this invention.

FIG. 1 is a view showing the sectional structure of the recording medium. Numeral 1 designates a substrate, numeral 2 a first inorganic material layer, and numeral 3 a recording film. It is essential that the first inorganic material layer 2 serving as the light absorbing layer contains principally at least one element selected from the group consisting of Bi, Te, Sb, In, Sn, Pb, Ge, Cr, Nb, Ni, Pd, Fe, Pt, Re, Ta, Th, Ti, Zr and Tl. Among this group of elements, Bi, In, Ge, Sn etc. have the advantage of being free of toxicity.

The first inorganic material layer may contain at least one element selected from the group consisting of oxygen, sulfur and selenium, in addition to at least one element among the aforecited group of elements. Oxygen and sulfur are free of toxicity, and are preferable. It is especially preferable that the content of the additional element or elements is at most 35 atomic-%. This measure brings forth the advantage that the light absorbing layer is difficult of deformation during the recording. Preferable are the combinations of Bi—S, In—S, Bi—In—S, Bi—Ge—S, Sn—In—S, Bi—Sn—S, Bi—O—S, BiS—O—In—S, Bi—O—Sn—S, Sn—O, In—O and Bi—O. Concretely, they are chalcogen glass, a multiple-layer made up of an oxide or sulfide and Bi or the like, a low sulfide, a low oxide, etc. Of course, small quantities of other elements may well mix into these compositions.

In particular, materials which are represented by the following formula are preferable:

$$A_x \cdot B_y \qquad \text{Formula (1)}$$

where A denotes at least one element selected from the group consisting of In, Bi, Te, Sb, Pb, Ge and Sn, while B denotes at least one element selected from the group consisting of S, Se and O, and where $65 \leq x \leq 100$ and $0 \leq y \leq 35$ hold.

Further, a range of $65 \leq x \leq 80$ is especially favorable. In case where x exceeds 80, the first inorganic material layer is prone to deformation.

The laser beam irradiated onto the recording medium is mostly absorbed by the first inorganic material layer 2. Heat generated in this region is applied to the recording film overlying this layer, to form holes or recesses.

Regarding the thickness of the light absorbing layer, a range of from at least 20 nm to at most 300 nm is preferable.

Regarding the thickness of the recording film, a range of from at least 20 nm to at most 200 nm is preferable, and a range of from at least 50 nm to at most 150 nm is especially preferable.

The substrate 1 on which the inorganic material layer and the recording layer above stated are formed has no essential influence on the recording. Whether the substrate is made of a transparent, semitransparent or opaque substance is set depending upon whether changes in the transmission factor are utilized or any other method is used in the thickness controls in the case of forming the respective layers on the substrate. In addition, since the physical quantities of the substrate such as heat capacity and reflectivity are limited by the intensity etc. of the laser beam employed, the substrate substance is also dependent upon them. The substances usually used for the substrate are oxide glass, such synthetic resins as polymethyl methacrylate, polyvinyl chloride, polyester and polyethylene, etc.

A method of forming the light absorbing layer may be any of sputtering, electron-beam evaporation, vacuum evaporation, intra-gaseous evaporation, etc. When an organic matter in a small amount (at most $\frac{1}{8}$ in terms of the ratio in thickness to the case of the evaporation of the single substance) is mixed by co-evaporation with the orgnic matter for the recording film or by multi-source high-speed-rotating evaporation, the thermal conductivity lowers to enhance the sensitivity.

Further, it is favorable to form the light absorbing layer by the intra-gaseous evaporation. This is based on the fact that the intra-gaseous evaporation film has a large number of voids therein and exhibits a low thermal conductivity. Preferably, a gas to be used contains principally at least one element selected from the group consisting of oxygen, nitrogen, argon and hydrogen. Among them, the gas principally containing oxygen is especially preferable. Preferably, the pressure of the gas lies within a range of $10^{-4} - 10^{-2}$ Torr.

As examples of the organic material to form the recording film, materials whose principal components are the following are mentioned:

A polymer of acrylic acid and methacrylic acid, ethyl- or methyl-ester thereof, and a derivative thereof (for example, acrylonitrile); or at least one polymer, copolymer, ester polymer or mixture selected from the group consisting of a carbon fluoride such as 3-fluoroethylene chloride and 4-fluoroethylene, vinyl chloride, vinylidene chloride, vinylidene fluoride, styrene, butadiene, butene, ethylene, propylene, chloroprene, vinyl acetate, urethane, vinyl alcohol, vinyl formal, vinyl butyral and ethylene glycol (for example, polyglycidyl methacrylate or ABS resin); or polyimide; or polyamide; or polyacrylamide; or polyvinyl pyrrolidone; or nitrocellulose; or cellulose acetate; or polyparaxylylene; or polyvinyl cinnamate; or polyvinylidene chloride; or polycarbonate; a polyester resin such as polyethylene terephthalate, or a phenol resin; or a phenol-formaldehyde resin; or a urea resin; or a silicone resin; or a furan resin; or a coumarone resin; or an epoxy resin; or a rosin-denatured maleic acid resin; or a rosin-denatured phenol resin; or alkylphenol resin; or a ketone resin; or an alkyd resin such as glycero-phthalic acid resin; or a polyhydric alcohol such as pinacol, ethylene glycol and hexanediol; or a higher alcohol such as myristyl alcohol; or higher fatty acid, aromatic carboxylic acid, carboxylic acid such as polycarboxylic acid, or a salt, ester etc. thereof, for example, myristic acid, palmitic acid, stearic acid, arachidic acid, behenic acid, lignoceric acid, cerotic acid, faatty amide, bis-fatty amide such as ethylene-bis-stearoamide, a polyhydric alcohol ester of fatty acid such as linseed oil and boiled oil or an oxide thereof, hydroxy fatty acid, abietic acid, neoabietic acid, dihydroabietic acid, phthalic acid, isophthalic acid, terephthalic acid, or succinic acid; or aromatic sulfonic acid such as sulfanilic acid; or phthalocyanine; or Rhodamine B; or sucrose; or diphenylene oxide; or an organic acyclic S compound such as thiourea; a heterocylic compound having N or S such as imidazole; or 1-aminoanthraquinone; or 2-aminoanthraquinone; or 2-aminoanthracene; or quinizarin; or purpuroxanthin; or anthrarufin; or quinazoline; or anthragallol; or tectoquinone; or indigo; or indirubin; or thioindigo; or hydroxyphenylacetic acid; or quinhydrone; or phthalanil; or fluorescein; or itatin; or valine; or leuco-methylene blue dye; or a leuco-auramine compound; or indolinobenzospyropylane; or at least one of, in general, an azo dye, anthraquinone dye, indigoide dye, phthalocyanine dye, carbonium dye, quinoneimine dye, methine dye, quinoline dye, nitro dye, nitrilo dye, benzoquinone and naphthoquinone dyes, naphthalimide dye, perinone dye, triacrylic methane dye, nitroso dye, stilbene dye, pyrazolone dye, thiazole dye and acrydine dye; or at least one of, in general, ester, acid imide, acid azide, acid imide and amine; or at least one of, in general, urethane and aminophenol; or gelatine or chitin; or hemicellulose; or pectin; or vegetable gum; or casein; or a wax such as low molecular weight polyethylene, paraffin, beeswax, carnauba wax, halowax, chloronaphthalene and low polymer of trifluoroethylene chloride; or shellac; or rosin; or asphalt; or vaseline; natural rubber; or synthesized rubber such as silicone rubber; or photoresist having been known; or polybutene sulfone; or a composite film made of the organic substances thus far described.

Among thes organic materials, ones whose melting points or softening points or sublimating temperatures are at least 60° C. and at most 200° C. are favorable, and ones whose melting points or softening points or sublimating temperatures are at least 70° C. and at most 150° C. are especially favorable.

By way of example, behenic acid, stearic acid, ketonic resins, low molecular weight polyethylene, paraffin, etc. are typical as such materials. Sublimable organic substances including leuco-methylene blue etc. are also favorable.

The organic substance film may well be caused to contain a light-absorbing inorganic substance by the co-evaporation, the multi-source high-speed-rotating evaporation or the like. As the light-absorbing inorganic substance, it is especially favorable to use the substance employed for the light absorbing layer.

As methods of forming the organic substance film, there can be adopted application under heating, application by dissolving the organic substance in a solvent, vacuum evaporation, sputtering, glow discharge, a method in which a monomer or a polymer of low molecular weight is cured by electron-beam irradiation, ultraviolet-ray irradiation or heating during or after evaporation, and so forth.

It is also effective for enhancing the sensitivity that the viscosity is lowered by electron-beam irradiation, ultraviolet-ray irradiation or the like after the organic substance film has been formed.

A thin intermediate layer may well exist between the light absorbing layer and the recording layer, or a protective film may well exist on the recording film. The intermediate layer or the protective film may be provided with holes or no hole in the recording. The layers other than the recording layer are allowed to undergo some deformation or changes of vaporization etc. during the recording, but it is more favorable in points of the error rate, the signal-to-noise ratio etc. at the readout that such deformation and changes do not occur.

As examples of the intermediate layer to intervene between the recording film and the light absorbing film, there are an oxide or chalcogenide layer which serves for preventing the chemical reaction or mutual diffusion between both the films, a carbon fluoride layer which lowers the wettability with the recording film so as to facilitate the provision of the holes, a surface-modified layer which is formed by plasma discharge, and fluoride layers which are made of $BiF_3$, $LiF$, $RhF_3$, $CeF_3$ etc.

When the recording medium of this invention is put into an improved structure as described below, the readout error rate can be further reduced.

Figure 2:
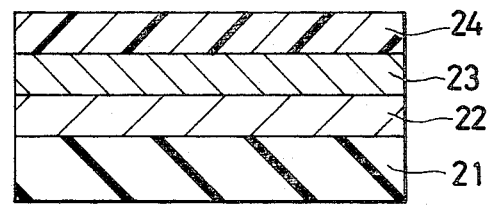

Fundamentally, the improved structure of the recording medium has a sectional structure as shown in FIG. 2. The present recording medium is such that a second inorganic material layer 23 to be stated later is disposed between a first inorganic material layer 22 which overlies a predetermined substrate 21 and a recording film 24 which is made of an organic substance.

Figure 3:
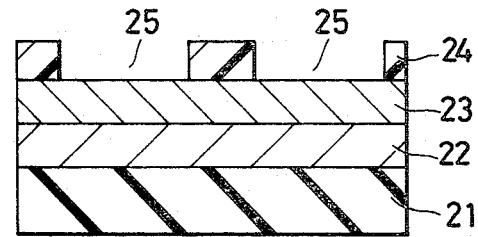
FIGS. 3 and 4 are a sectional view of a recording medium and a bird's-eye view of a disc-shaped medium in the case where information have been written, respectively.
Figure 4:
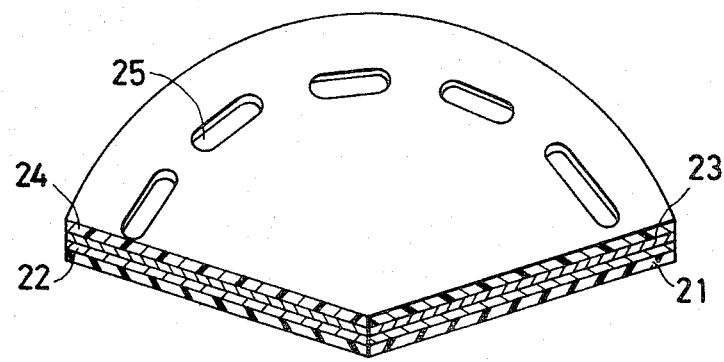

Most of the working or recording beam projected on the recording medium is absorbed by the first inorganic material layer 22, and heat generated in this region is given to the recording film over this layer, to form holes or recesses in the recording film. The presence of the second inorganic material layer plays a more important role for the accomplishment of the object of this invention. This point will be described later. FIGS. 3 and 4 show the states in which information have been written, and they are respectively a sectional view of the essential portions and a bird's-eye view of a recording medium constructed in the shape of a disk. Of course, the dimensions of the respective layers and the written holes are enlarged or contracted and are not made exact in order to facilitate understanding. Parts 25 in FIGS. 3 and 4 are the holes stated above. As seen from FIG. 4, the holes 25 are nearly elliptic and are arrayed in a row. The information are recorded in the form of the existence or nonexistence of the holes and by the major diameters of the holes as well as the spacings between the holes. In case where the holes are not formed but the recesses are formed, these recesses similarly correspond to the information.

The first inorganic material layer and the recording layer are as described heretofore.

Preferable as the material of the second inorganic material layer is a chalcogenide or oxide, or a mixture or compound consisting of the chalcogenide or oxide and a metal, semimetal or semiconductor, for example, a material which contains at least one element selected from the group consisting of In, Bi, Te, Sb, Pb, Ge, Sn, Cu, Zn, Cd and Ga and at least one element selected from the group consisting of Te, Se, S and O. In particular, a material which contains in the following appropriate quantity at least one element selected from the group consisting of In, Bi, Te, Sb, Pb, Ge and Sn is favorable. A material which is amorphous is more favorable.

The quantity is represented by the formula:

$$D_s . E_t \qquad \text{Formula (2)}$$

where D denotes at least one element selected from the group consisting of In, Bi, Te, Sb, Pb, Ge and Sn, while E denotes at least one element selected from the group consisting of S, Se and O, and where $25 \leq s \leq 60$, $40 \leq t \leq 75$ and $s < x$, $y < t$ hold.

By selecting the composition under conditions of $|s-x| \geq 10$ and $|y-t| \geq 10$, the effect of this invention is made sufficient.

The first function of the second inorganic material layer is to prevent the surface of the first inorganic material layer from melting or oxidizing by selecting the material of the second inorganic material layer as described above and making the material composition of the second inorganic material layer different from that of the first inorganic material layer. The second function is to make it possible to obtain great readout signals at the readout of the recorded information. More specifically, those components of the readout light which are reflected at the interface between the first and second inorganic material layers and at the interface between the second inorganic material layer and the organic substance film or a gas (in some cases, liquid for protection) on the surface of the disk give rise to interference. For this reason, when the wavelength of the incident light has been changed, the reflected or transmitted light intensity oscillates greatly by increasing and decreasing. In case where the organic substance film exists, the crests and troughs of the oscillations shift (usually, onto the longer wavelength side) in comparison with those in the case where the film does not exist or is thin. Therefore, when the information are observed at a specified wavelength, larger changes in the reflection factor or the transmission factor are produced. It is ordinarily difficult to obtain large readout signals by the use of the recording in the organic material film, for the reason that the organic material film has a low reflection factor and absorbs light little and the reason that the film cannot be thickened because the holes or recesses are formed at a high density. However, large readout signals can be provided by utilizing the effect of the second inorganic material layer as described above. This effect can be exploited best by setting the thickness (d) of the second inorganic material layer at $2 \cdot n \cdot d = m\lambda \pm \Delta\lambda$ (where n indicates the refractive index, m an integer, $\lambda$ the wavelength of the readout light, and $30 \text{ nm} \leq \Delta\lambda \leq 90 \text{ nm}$). Owing to this effect, the readout error rate diminishes. (In cases of video signals etc., the signal-to-noise ratio increases).

It is recommended to put the thicknesses of the first and second inorganic material layers into a range of from at least 30 nm to at most 300 nm and a range of from at least 20 nm to at most 300 nm, respectively. As the thicknesses of the organic substance film, a value of from at least 20 nm to at most 250 nm is favorable, and a value of from at least 50 nm to at most 200 nm is particularly favorable. Preferably, the thickness of the second inorganic material layer is held in the relation of $2 \cdot n \cdot d = m\lambda \pm \Delta\lambda$ as previously stated within the aforecited range. Of course, even when this condition is not met, the structure can be used as a recording medium. By way of example, in case where $2 \cdot n \cdot d < \lambda/2$, a high contrast is attained by the lowering of the reflectivity based on the formation of the organic substance film.

When the thicknesses of the first and second inorganic material layers are too small, the predetermined effect does not appear sufficiently. On the other hand, when they are unnecessarily great, heat conduction in the lateral direction increases to incur a lowering in the sensitivity.

The boundary between the first and second inorganic material layers need not be definite. If possible, the compositions of the layers may well vary continuously with a gradient.

The method of manufacturing the first and second inorganic material layers may be any of the sputtering, the electron-beam evaporation, the vacuum evaporation, etc. as stated previously. When an organic substance in a small amount (at most ⅓ in terms of the ratio in thickness to the case of the evaporation of the single substance) is mixed by the co-evaporation with the organic substance for the organic substance film or by the high-speed rotary evaporation, the thermal conductivity lowers to enhance the sensitivity.

Of course, the film of the organic substance, the first inorganic substance layer and the second inorganic substance layer may well include another thin layer, not hindering the heat conduction, therebetween without lying in direct contact with each other. By way of example, the reaction between and the oxidation of the respective layers can be prevented by disposing an oxide layer or a layer of a high-melting metal (one having a melting point of at least 300° C. is especially preferable). In addition, when a surfactant layer made of carbon fluoride or the like or a fluoride layer made of $BiF_3$, $LiF$, $RhF_3$, $CeF_3$ or the like and having a thickness of 3–300 nm is interposed between the second inorganic substance layer and the organic substance film or when carbon fluoride or the like is mixed into the organic substance film, the recording is facilitated.

The recording medium of this invention can especially achieve an enhancement in the stability through an improvement as described hereunder.

Figure 5:
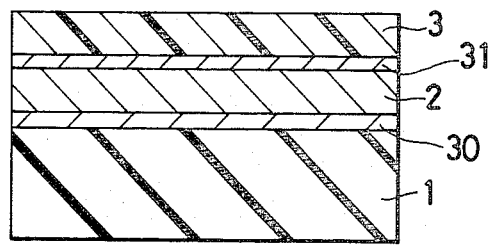
FIG. 5 is a sectional view showing another embodiment.

The improved structure of the recording medium has a sectional structure as shown in FIG. 5. The present recording medium comprises the first inorganic material layer 2 of the aforecited composition which overlies the predetermined substrate 1, (stabilizing) thin layers 30 and 31 of Au or the like which exist on both the sides of the layer 2 (a thin layer may well be disposed on either one side), and the recording film 3 which is principally made of the organic substance and which overlies the layer 31. The stabilizing thin layer existing between the first inorganic material layer 2 and the recording layer 3 may be provided with holes or no hole during the recording. It is especially favorable that a layer of an oxide or chalcogenide of at least one element selected from the group consisting of In, Bi, Te, Sb, Pb, Ge and Sn exists between the first inorganic material layer and the recording layer. In case of disposing the stabilizing thin layer on that side of the first inorganic material layer which opposes to the recording layer, this stabilizing thin layer is located closer to the first inorganic material layer. The oxide or chalcogenide layer corresponds to the second inorganic material layer. Accordingly, the order of the constituent layers is the first inorganic material layer—the stabilizing thin layer—the second inorganic material layer—the recording layer.

Especially favorable as the principal constituent of the stabilizing thin layer is at least one element selected from the group consisting of Au, Al, Ti, Pd, Cr, Ni, Co, Sn and Ge.

Preferably, the thickness of that one of the stabilizing layers which lies remote from the recording film (the first stabilizing layer) falls within a range of from at least 1 nm to at most 50 nm. The function of this layer is to cut off oxygen and water which otherwise permeate from the substrate side, especially in case of employing a substrate of an organic substance. Accordingly, when this layer is too thin, the effect is slight, and when it is too thick, the recording sensitivity lowers due to heat conduction in the lateral direction. The thickness of the other stabilizing layer close to the recording film side (the second stabilizing layer) is preferred to fall within a range of from at least 1 nm to at most 10 nm. The function of this layer is to cut off oxygen and water which permeate from the recording film side. Accordingly, when this layer is too thin, the effect is slight likewise to the above, and when it is too thick, not only the loss ascribable to the heat conduction increases but also the optimum condition for light absorption is not met, so that the recording sensitivity lowers.

The existence of the stabilizing layer on either one side of the light absorbing layer is effective, but the existence of the stabilizing layers on both the sides is favorable.

Preferable for the thickness of the light absorbing layer is a range of from at least 2 nm to at most 300 nm.

Preferable for the thickness of the recording film is a range of from at least 20 nm to at most 200 nm, and especially preferable is a range of from at least 50 nm to at most 150 nm.

As a method of forming the stabilizing layer, there can be adopted any of vacuum evaporation, sputtering, electron-beam evaporation, etc.

EXAMPLE 1

Figure 6:
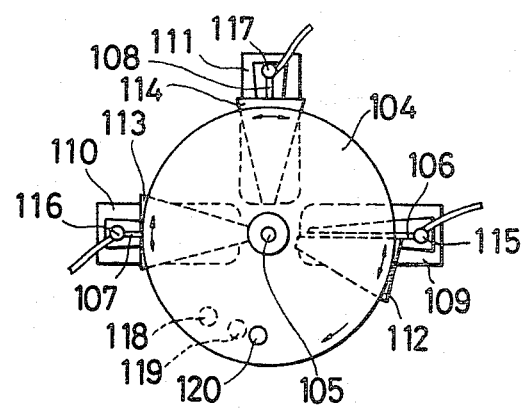
FIG. 6 is an explanatory view of an evaporation apparatus.

A substrate which was made of a chemically reinforced glass disk having a diameter of 31 cm and a thickness of 1.1 nm was prepared, and a first inorganic material layer was formed thereon by the use of a vacuum evaporation apparatus of a structure as shown in FIG. 6. FIG. 6 is a plan view of the apparatus. The substrate 104 was rotated about a central shaft 105 at a rotational frequency of 120 $min^{-1}$. Evaporating boats 106, 107 and 108 were arranged under the substrate 104, and masks 109, 110 and 111 having sectoral slits were respectively arranged over the evaporating boats. Further, the masks 109, 110 and 111 having the sectoral slits were provided with shutters 112, 113 and 114 respectively. The quantities of vaporization of evaporation substances were detected by quartz oscillator type film thickness monitors 115, 116 and 117. On the other hand, the thickness of the evaporated film could be controlled by detecting the transmission factor by means of a projector 118 which was arranged under the substrate 104 and which put a semiconductor laser beam into a collimated beam and caused it to enter the substrate slightly obliquely thereto and a light receptor 120 which overlay the projector 118 with the substrate 104 held therebetween, and by detecting the reflection factor by means of a light receptor 119 which underlay the substrate 104 similarly to the projector 118.

Bismuth and behenic acid were respectively placed in the evaporating boats 106 and 107 as starting evaporation materials.

First, the interior of the evaporation apparatus was exhausted to $2 \times 10^{-5}$ Torr. Subsequently, oxygen gas was introduced through a variable leak valve and held at $4 \times 10^{-3}$ Torr. At the next step, Bi was vaporized by causing current to flow through the boat 106 and was evaporated to a film thickness of about 15 nm at an evaporation rate of 3 nm/min. Subsequently, the current was increased and Bi was evaporated to a film thickness of 40 nm at a rate of 6 nm/min, whereupon the current was further increased and Bi was evaporated to 80 nm at a rate of 8 nm/min. Thus, the first inorganic material layer was formed.

Subsequently, the leak valve was closed, and the interior of the evaporation apparatus was exhausted to $2 \times 10^{-5}$ Torr again. Thereafter, behenic acid was vaporized by causing current to flow through the boat 107 and was evaporated to a film thickness of about 80 nm. Thus, a recording film was formed.

Figure 7:
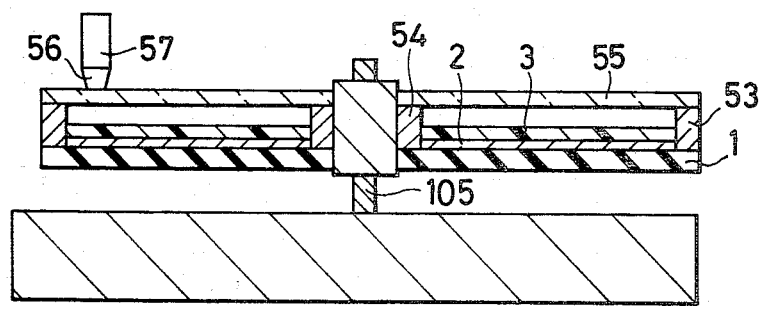
FIG. 7 is a sectional view showing the state in which a recording medium is actually mounted.

FIG. 7 shows a sectional view of a recording medium actually mounted. After spacers 53 and 54 each having a thickness of 0.5 mm and a width of 10 mm were bonded to the outer periphery and inner periphery of the disk, a chemically-reinforced glass disk 55 having a diameter of 31 cm and a thickness of 1 mm was bonded so as to protect the recording film. Numerals 2 and 3 in the figure designate the first inorganic material layer and the recording film, respectively.

In this way, the recording medium of this invention was finished. Information were written into and read out from the present recording medium by the following procedure.

As shown in FIG. 7, the present recording medium (disk) was set on a recording apparatus, and it was rotated about a rotary shaft 105 at a rotational frequency of 240 $min^{-1}$. A semiconductor laser having a wavelength of 830 nm and a power of 10 mW was employed as a light source. A laser beam 56 was pulse-modulated at a pulse width of 100 ns by digital signals, was focused through the chemically-reinforced glass disk 55 by a lens disposed within a readout head 57, and was projected on the recording film and the light absorbing layer 2 and 3. In parts where the laser beam was projected, an array of elliptic holes each having a minor diameter of about 0.8 $\mu$m and being close to a circle were recorded in the recording film made of the organic substance. The presence or absence of the hole corresponds to the information.

The readout was carried out as follows. While rotating the disk at a rotational frequency of 240 $min^{-1}$, a beam of a semiconductor laser having a wavelength of 830 nm and a power of 5 mW was focused through the chemically-reinforced glass disk by a lens and was projected on the recording film and the light absorbing layer. Intensity changes of reflected light were detected by a detector, to obtain reproduced signals. The error rate of the readout was about $10^{-6}$. Since the light absorbing layer in the present example transmits the readout light in a small amount, it is also possible to cause the readout beam to enter from the substrate side and to read out information with the reflected light.

Figure 8:
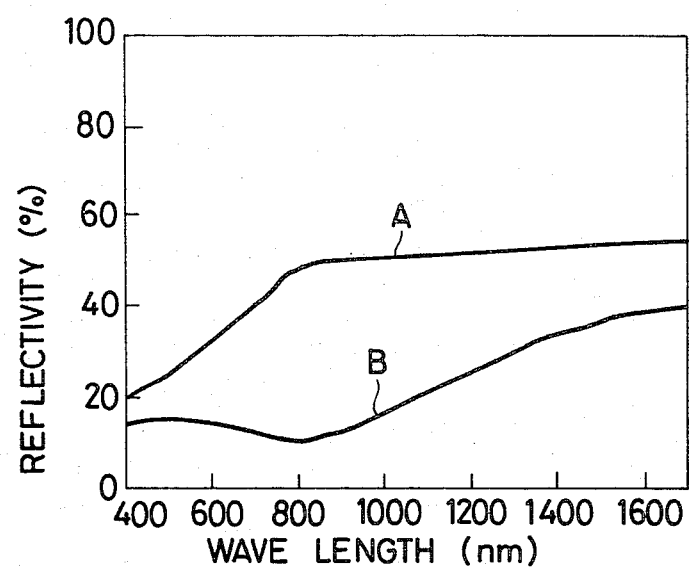
FIGS. 8 and 13 are diagrams showing the wavelength-dependencies of the reflectivities of recording media.

FIG. 8 shows the reflectivity of the recording medium. Curve A indicates the reflectivity of a film obtained by evaporating Bi in oxygen, while curve B indicates the reflectivity of a film obtained by applying a ketone resin on the evaporated film to a thickness of about 80 nm. As understood from the figure, sufficient differences of the reflectivities can be produced on the basis of the presence or absence of the holes in the recording layer.

The recording power required rose due to the heat conduction when the first inorganic material layer was made too thick, and due to the decrease of the light absorption when it was made too thin.

200 nm: ~15 mW, 300 nm: ~20 mW,
50 nm: ~15 mW, 20 nm: ~20 mW, 10 nm: ~30 mW

In case where the thickness of the recording film was great, an increase in the error rate was incurred due to the deformation of the holes.

300 nm: ~$10^{-4}$, 200 nm: ~$10^{-5}$,
150 nm: ~$3 \times 10^{-6}$, 50 nm: ~$3 \times 10^{-6}$,
20 nm: ~$10^{-5}$, 10 nm: ~$10^{-4}$ When the atomic number ratio between Bi and oxygen in the first inorganic material layer was changed, the recording power rose rapidly from near a point at which the Bi content became smaller than 65 atomic-%. On the other hand, when the Bi content became 50 atomic-%, a power of about 30 mW was required. Also in case where Al was vaporized from the boat 108 in FIG. 6 so as to mix Al into the light absorbing layer, the recording power rose suddenly when the Bi content came short of 65 atomic-%.

It was also attempted to evaporate $CeO_2$ as an intermediate layer from the boat 108 after having evaporated the first inorganic material layer and before evaporating the recording film.

When the thickness of the $CeO_2$ film was changed and the thickness of the recording film was concurrently changed so that the minimum of the reflectivity might always come to 830 nm, the error rate changed as follows:

10 nm: ~$5 \times 10^{-6}$, 20 nm: ~$5 \times 10^{-5}$, 30 nm: ~$10^{-3}$

The chemically-reinforced glass employed in the present example is high in strength, is less prone to deformation and has a hard surface, and is therefore suitable for the substrate and the recording film-protective plate.

In addition to the foregoing, recording media employing first inorganic material layers and recording films listed in Table 1 can produce equal or similar characteristics.

In case of using metals other than the first inorganic materials according to this invention, both the error rate and the recording power are high, and the objects of this invention cannot be achieved. In an example which employed Al for the first inorganic material layer and an alkyl phenol resin for the recording film, the error rate was about $10^{-3}$ even when various design conditions were made the optimum conditions.

In this case, the total content of group-A elements is a problem, and similar effects are produced whatever element is changed. When the sum of the contents of Bi and In of the first inorganic material layer becomes below 65 atomic-%, the light absorption decreases and the laser power required for the recording rises rapidly. On the other hand, also in case where the sum of the contents increases, the reflectivity becomes high and the laser power rises. In addition, in case where a value of 80 atomic-% is exceeded, the first inorganic material layer can melt in the recording. Laser energy required for the recording of this invention is 5–10 mJ/cm$^2$ at the surface of the recording material film. This level is approximately 1/5–1/10 of energy required for record-

TABLE 1

| No. | Light absorbing film | Recording film |
| --- | --- | --- |
| 1 | Film of evaporation of Sn in O$_2$-gas | Behenic acid |
| 2 | Film of evaporation of In in Ar-gas | Behenic acid amide |
| 3 | Bi$_{90}$O$_{10}$ | Stearic acid |
| 4 | Te$_{60}$O$_{40}$ | Low molecular weight-polyethylene |
| 5 | Ge | Ketone resin |
| 6 | Sb | Polybutenesulfon |
| 7 | Cr | Behenic acid |
| 8 | Pd | Palmitic acid |
| 9 | One of Nb, Pb, Ni, Fe, Pt, Re, Ta, Th, Ti, Zr and Tl | Alkylphenol resin |
| 10 | Bi$_{90}$Sb$_{10}$ | Paraffin |
| Comparative Examples | Au | Paraffin Recording was impossible even with a recording power of 30 mW.) |
|  | Al | Paraffin (Recording was impossible even with a recording power of 30 mW.) |

EXAMPLE 2

Likewise to Example 1, a disk-shaped chemically-reinforced glass substrate was prepared.

Bi and In$_2$S$_3$ were put in the evaporating boats 106 and 107 as starting evaporation materials, respectively. The ratio of the quantities of vaporization from the respective evaporating boats 106 and 107 were controlled so that the ratio of the atomic numbers of Bi and In might become approximately 1:1. First, the ratio between the opening angles of the shutters 112 and 113 for Bi and In$_2$S$_3$ was made 3:1, and the materials were evaporated until the thickness of a film reached 80 nm. Thus, the first inorganic material layer was formed. Subsequently, the shutters 112 and 113 were gradually opened so as to establish an opening angle ratio of 1:3, and the materials were evaporated until the thickness of the film reached 160 nm. Thus, the second inorganic material layer was formed. The composition of the first inorganic material layer was Bi$_{55}$In$_{18}$S$_{27}$, while the composition of the second inorganic material layer was Bi$_{12}$In$_{35}$S$_{53}$.

On the substrate thus prepared, a ketone resin dissolved in a solvent of cyclohexanone was rotatingly applied to a thickness of 150 nm at a rotational frequency of 400 min$^{-1}$ by the use of a spinner.

In this way, the recording medium of this invention is finished.

The error rate of the information readout from this recording medium was about $10^{-5}$.

Figure 9:
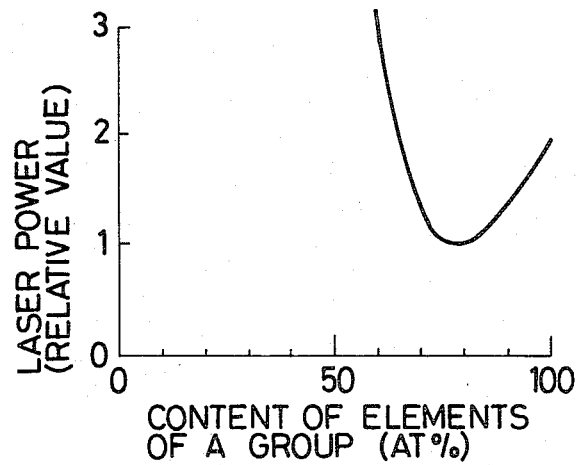
FIGS. 9 and 10 are diagrams showing the relationships between laser powers required for recordings and material compositions.

FIGS. 9 to 12 are graphs of various characteristics on a recording medium in which the first inorganic material layer was made of a Bi-In-S-based material, the second inorganic material layer was made of Bi$_{12}$In$_{35}$S$_{53}$ and the recording film was made of a ketone resin. FIG. 9 is a diagram showing the variation of the laser power required for recording in the case of changing the composition of the first inorganic material layer.

ing with conventional recording media of the specified type.

Figure 10:
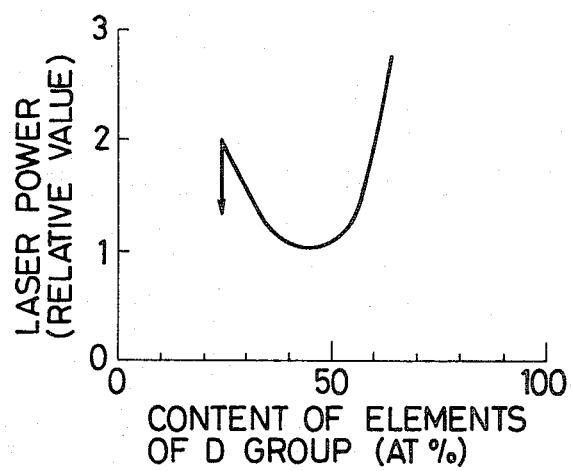

FIG. 10 is a diagram showing the variation of the laser power required for recording in the case where, similarly to the examples thus far described, the first inorganic material layer was made of Bi$_{55}$In$_{18}$S$_{27}$, the recording film was made of the ketone resin and the second inorganic material layer was made of the Bi—In—S-based material and where the composition of the second inorganic material layer was varied. In case where the content of group-D elements of the second inorganic material layer increases, the reflectivity of this layer itself increases and the laser power required for the recording increases. On the other hand, in case where the content of the group-D elements is too low, the content of the chalcogen element increases and the evaporated film becomes unstable. Accordingly, $25 \leq s \leq 60$ atomic-% is a feasible composition range.

Also, in this case, the total content of the group-D elements is a subject, and similar effects are produced whatever element is changed.

Figure 11:
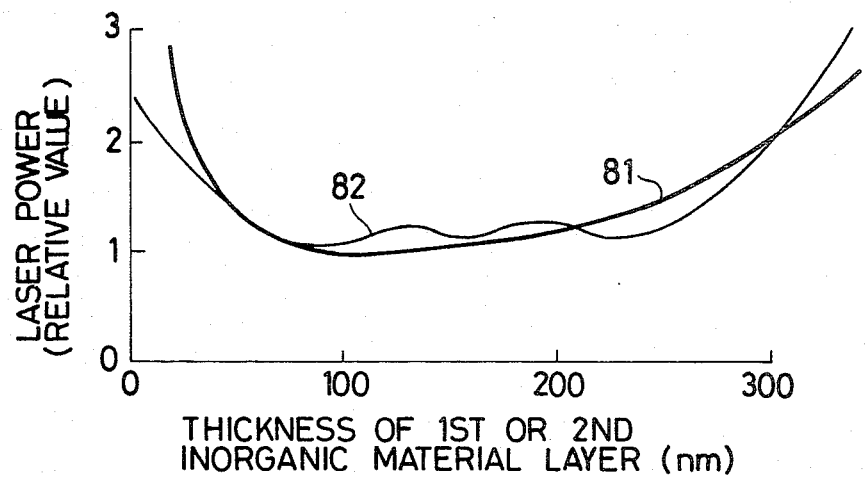
FIGS. 11 and 12 are diagrams showing the relationships of the thickness of an inorganic material layer and the thickness of a recording layer to laser powers required for recordings, respectively.

FIG. 11 is a diagram showing the laser power required for recording at the time when the thicknesses of the first and second inorganic material layers were changed. Curve 81 and curve 82 indicate examples of the characteristics in the case where the thickness of the first inorganic material layer and that of the second inorganic material layer were varied, respectively. It is understood that the thicknesses of the first and second inorganic material layers are preferred to lie in a range of from at least 30 nm to at most 300 nm and a range of from at least 20 nm to at most 300 nm, respectively. The first and second inorganic material layers were respectively made of Bi$_{55}$In$_{18}$S$_{27}$ and Bi$_{12}$In$_{35}$S$_{53}$, and the recording film was made of the ketone resin.

Figure 12:
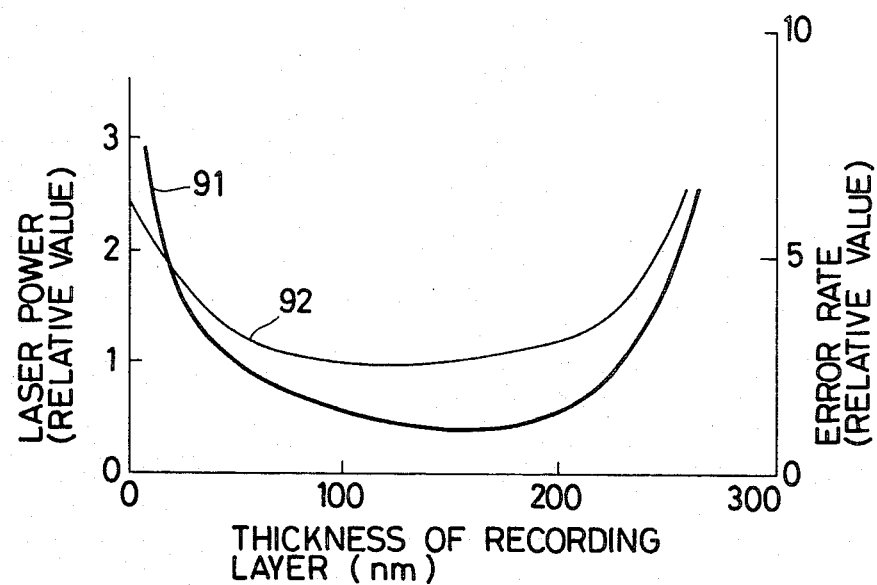

FIG. 12 is a diagram showing the variation of the laser power required for recording and the error rate of readout in the case where the thickness of the organic-substance recording film was varied. The remaining construction was the same as in the example of FIG. 11. Curve 91 is a characteristic curve indicating the readout error rate, and curve 92 a characteristic curve indicating the laser power required for the recording. It is understodd that a range of from at least 20 nm to at most 250 nm is practical from the viewpoint of the readout error rate.

Thus far, the examples in which the first and second inorganic materials were the Bi-In-S-based material have been described. However, recording media employing materials listed in Table 2 could attain similar characteristics.

The error rate of readout of this recording medium was approximately $3 \times 10^{-6}$.

When the thickness of the second stabilizing layer was increased, the recording power became high and the error rate became great.

15 nm: ~20 mW, 20 nm: ~30 mW, 30 nm: Recording was impossible.

When the thickness of the first stabilizing layer was increased, the recording power rose.

40 nm: ~20 mW, 50 nm: ~30 mW, 70 nm: Recording was impossible.

In case where neither of the stabilizing layers on both the sides was formed, the transmission factor of the Bi layer increased and the sensitivity lowered down to

TABLE 2

| First inorganic material | Second inorganic material | Recording layer |
|---|---|---|
| $Bi_{80}O_{20}$ | $Bi_{55}O_{45}$ | Alkylphenol resin |
| $Sn_{80}O_{20}$ | $In_{15}Sn_{40}O_{45}$ | Rosin-denatured maleic acid resin |
| $Sn_{70}S_{30}$ | SnS | Low molecular weight-polyethylene |
| $Bi_{70}O_{30}$ | $Bi_{50}O_{50}$ | Low molecular weight-polyethylene |
| Te | $In_2S_3$ | Ketone resin |
| $In_{70}O_{30}$ | $In_2O_3$ | Alkylphenol resin |
| $Bi_{80}O_{20}$ | $In_2S_3$ | Alkylphenol resin |
| $Sn_{10}In_{60}O_{30}$ | $Bi_{50}O_{40}Se_{10}$ | Alkylphenol resin |
| $Sb_{70}Se_{30}$ | $Sb_2S_3$ | Polyamide resin |
| $Pb_{60}S_{30}Se_{10}$ | SnS | Methylenebisstearoamide |
| $Te_{65}O_{35}$ | $Te_{40}O_{60}$ | Stearic acid amide |
| $Ge_{65}S_{35}$ | GeS | Fatty saponificated ester |
| $Bi_{70}Se_{30}$ | $In_{40}Se_{50}S_{10}$ | Low molecular weight-polypropylene |
| $In_{70}Se_{20}O_{10}$ | $Pb_{50}S_{40}O_{10}$ | Cellulose acetate |

Figure 13:
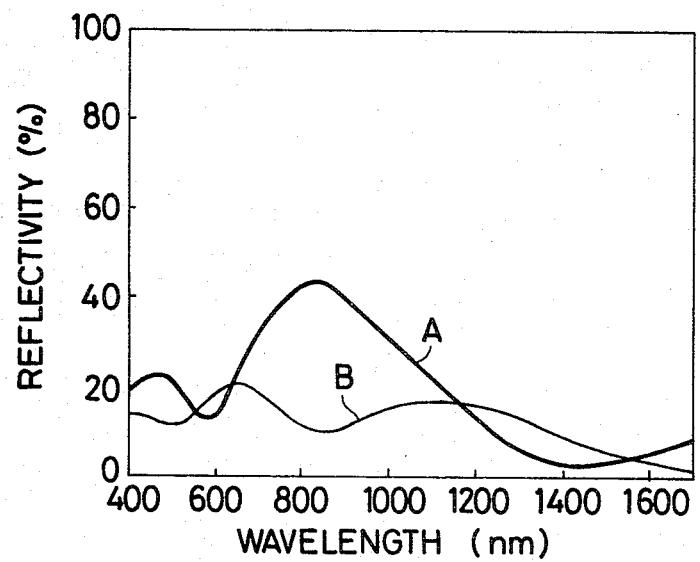

FIG. 13 shows reflectivities at various wavelengths before applying the organic-substance recording film (A) and after applying it (B), concerning a case where Bi being 80 nm thick was employed as the first inorganic material layer, $In_2S_3$ being 150 nm thick as the second inorganic material layer and a ketone resin layer being 120 nm thick as the organic-substance recording film. When the thickness of the second inorganic material layer was approximately 30 nm, nether the lowering of the reflectivity at wavelengths of 800 nm before the application nor the lowering of the reflectivity at wavelengths of above 1,000 nm after the application took place, and high reflectivity levels were held. On the other hand, a high contrast was attained in the vicinity of 830 nm. In this case, the oscillations of the reflectivity at wavelengths below 800 nm become gentle.

EXAMPLE 3

Likewise to Example 1, a disk-shaped chemically-reinforced glass substrate was prepared.

Au, Bi and behenic acid were respectively put in the evaporating boats 106, 107 and 108 as starting evaporation materials.

First, the interior of the evaporation apparatus was exhausted to $2 \times 10^{-5}$ Torr. Au was vaporized and was evaporated to a film thickness of about 10 nm at an evaporation rate of 30 nm/min, to form the first stabilizing layer. Subsequently, Bi was evaporated to a thickness of 40 nm at a rate of 60 nm/min, to form the first inorganic material layer. Thereafter, Au was evaporated to a thickness of 5 nm again, to form the second stabilizing layer.

At the next step, the interior of the bell jar was put into $2 \times 10^{-5}$ Torr, whereupon current was caused to flow through the boat 107 so as to vaporize behenic acid and to evaporate it to a thickness of about 80 nm. Then, the recording film was obtained.

about ⅔ in a lifetime test in which light of a halogen lamp at 60,000 luxes was projected on the recording medium at 60° C. for 500 hours. In contrast, the lowering of the sensitivity was slight in the present example in the same test. Even when the stabilizing layer was thinned down to 1 nm, the result was similar. However, when it was made 0.5 nm thick, the lowering of the sensitivity increased abruptly. Regarding stabilizing layers made of materials other than Au, the effects of the layers were similarly noted.

The recording power rose due to the heat conduction when the thickness of the light absorbing layer was made great and due to the decrease of the light absorption when it was made small. Accordingly, the lifetime of the semiconductor laser was shortened.

200 nm: ~20 mW, 300 nm: ~30 mW, 5 nm: ~20 mW, 2 nm: ~30 mW, 1 nm: Recording was impossible.

A preferable range of thicknesses of the recording film was the same as in Example 1.

In the example stated first, it was also attempted to evaporate $CeO_2$ from the boat 108 after having evaporated the second stabilizing layer and before evaporating the recording film. When the thickness of the film of $CeO_2$ was varied and the thickness of the recording film was concurrently varied so that the minimum of the reflectivity might always come to 830 nm, the error rate changed as follows:

10 nm: ~$10^{-5}$, 20 nm: $10^{-4}$, 30 nm: ~$10^{-3}$

When an $In_2S_3$ layer having a thickness of about 180 nm was formed instead of the $CeO_2$ layer, the laser power required for the recording rose, but the error rate was about $5 \times 10^{-5}$.

It is also favorable to use chemically-reinforced glass in lieu of the acrylic resin employed in the present example. The chemically-reinforced glass is high in strength, is less liable to change, and has a hard surface.

Besides the recording media referred to above, recording media employing light absorbing layers and recording films listed in Table 3 can attain equal or similar characteristics.

TABLE 3

| No. | First Stabilizing Layer | Light Absorbing Film | Second Stabilizing Layer | Recording Film |
|---|---|---|---|---|
| 1 | Pd | Bi | Al | Behenic acid |
| 2 | Au | Bi | Ge | Film of co-evaporation of behenic acid amide and Bi (30% of Bi in weight ratio) |
| 3 | Au | $Bi_{90}O_{10}$ (film of evaporation of Bi in $O_2$-gas | Au | Stearic acid |
| 4 | Cr | $Te_{60}O_{40}$ | Au | Low molecular weight-polyethylene |
| 5 | Al | Te | Pd | Succinic acid imide |
| 6 | Ti | Te | Co | Succinic acid |
| 7 | Ge | Te | Sn | Fumaric acid |
| 8 | Ni | $Si_{80}H_{20}$ | Ag | Palmitic acid |

What is claimed is:

1. A recording medium which comprises a substrate, a first inorganic material layer which exhibits sufficient light absorbitivity for projecting light to generate heat upon absorption of said projected light and which overlies said substrate, a second inorganic material which exhibits a read-out light transmissivity higher than that of said first inorganic material layer and which overlies said first inorganic material layer, and a recording layer which is disposed over said second inorganic material layer and which contains at least one organic material as a principal component so that said recording layer is capable of forming recesses or holes upon receiving heat generated from said first inorganic material layer; said first inorganic material layer containing at least 65 atomic% of at least one element selected from the group consisting of In, Bi, Te, Sb, Ge, Sn, Pb, Cr, Nb, Ni, Pd, Fe, Pt, Re, Ta, Th, Ti, Zr and Tl and up to 35 atomic% of at least one element selected from the group consisting of S, Se and O.

2. A recording medium according to claim 1, wherein the first inorganic material is an inorganic material represented by a formula $A_x.B_y$ where A denotes at least one element selected from the group consisting of In, Bi, Te, Sb, Pb, Ge and Sn, and B denotes at least one element selected from the group consisting of S, Se and O, and where $65 \leq x \leq 100$ and $0 \leq y \leq 35$, and the second inorganic material is an inorganic material represented by a formula $D_s.E_t$ where D denotes at least one element selected from the group consisting of In, Bi, Te, Sb, Pd, Ge and Sn, and E denotes at least one element selected from the group consisting of S, Se and O, and where $25 \leq s \leq 60$ and $40 \leq t \leq 75$.

3. A recording medium according to claim 2, wherein said first inorganic material layer is made of an inorganic material represented by a formula $A_x.B_y$ where A denotes at least one element selected from the group consisting of In, Bi, Te, Sb, Pb, Ge and Sn, while B denotes at least one element selected from the group consisting of S, Se and O, and where $65 \leq x \leq 80$ and $20 \leq y \leq 35$.

4. A recording medium according to claim 1 or claim 2, wherein the organic material film is made of an organic material which has a melting point or a softening point of 60° C. to 200° C.

5. A recording medium according to claim 1, 2, or 3, wherein said first and second inorganic material layers have a composition variation in a direction of their thickness.

6. A recording medium according to claim 1, 2, or 3, wherein a thickness of said first inorganic material layer lies in a range of 30 nm to 300 nm, a thickness of said second inorganic material layer lies in a range of 20 nm to 300 nm, and a thickness of the organic material film lies in a range of 20 nm to 250 nm.

7. A recording medium according to claim 1, 2, or 3, wherein a thickness (d) of said second inorganic material layer lies in a range of 20 nm to 300 nm, and a relation of $2 \cdot n \cdot d = m\lambda \pm \Delta\lambda$ (where n denotes a refractive index, m an integer, and $\lambda$ a wavelength of the readout light, and 30 nm $\leq \Delta\lambda \leq$ 90 nm holds) is fulfilled.

8. A recording medium according to claim 1, wherein at least one stabilizing layer is disposed in proximity to at least one surface of said first inorganic material layer and said recording layer being disposed over said at least one stabilizing layer.

9. A recording medium according to claim 8, wherein said at least one stabilizng layer contains as its principal component at least one element selected from the group consisting of Au, Ag, Al, Pd, Ti, Zr, Rh, Pt, Th, Cr, Ni, Co, Sn, Ge and Si.

10. A recording medium according to claim 9, wherein two stabilizing layers are provided, that one of the stabilizng layers which exists on a side remote from said recording film having a thickness of 1 nm to 50 nm, and the other stabilizing layer which exists on a side close to said recording film having a thickness of 1 nm to 10 nm.

11. A recording medium according to claim 1, wherein a thickness of said first inorganic material layer is 20 nm to 300 nm, and a thickness of said recording film is 20 nm to 200 nm.

12. A recording medium according to claim 8, 9, or 10, wherein a thickness of said first inorganic material layer is 2 to 300 nm, and a thickness of said recording film is 20 nm to 200 nm.

13. A recording medium according to claim 1, wherein said substrate is comprised of glass or a synthetic resin.

* * * * *